Feb. 13, 1951     S. W. WARREN     2,541,136
MOTION-PICTURE FILM WITH MAGNETIC SOUND TRACK
Filed Dec. 1, 1944     2 Sheets-Sheet 1
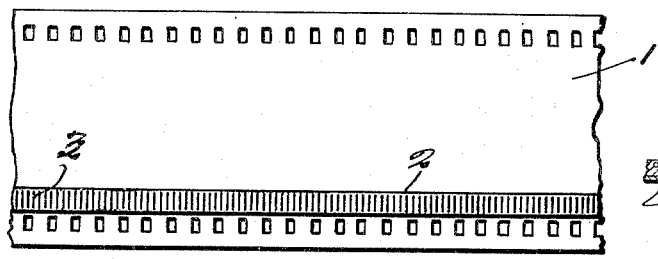
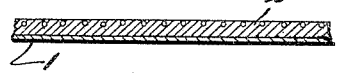
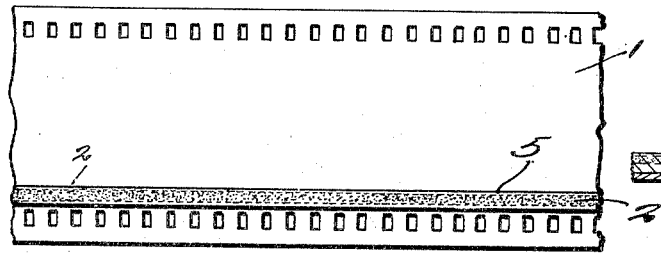
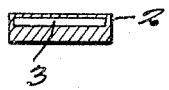
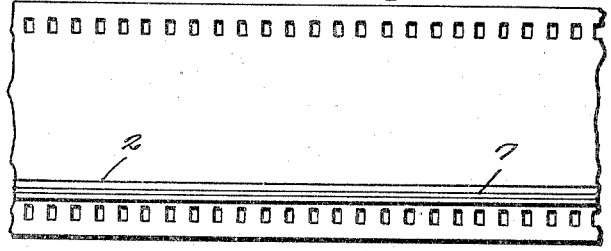
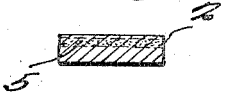
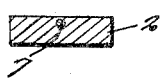
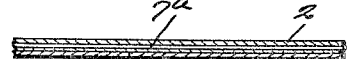
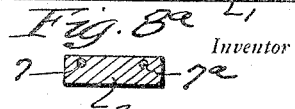
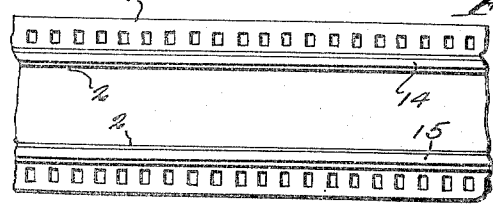
Inventor
Stanley W. Warren
By Clarence A. O'Brien
and Harvey B. Jackson
Attorneys

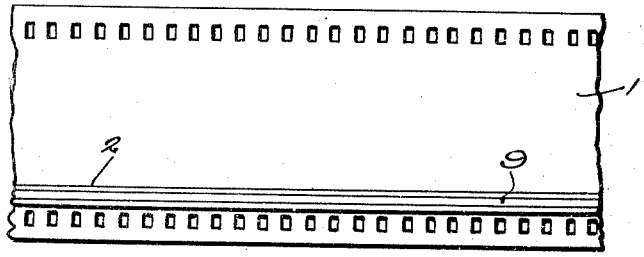
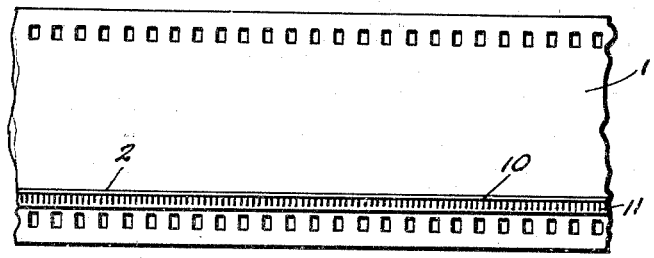
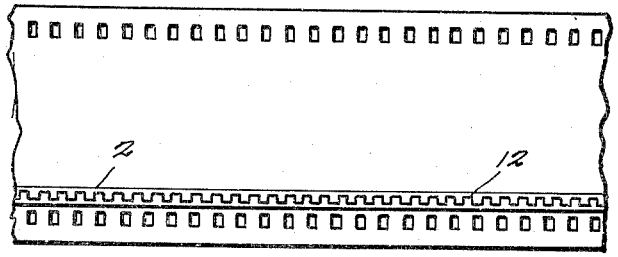
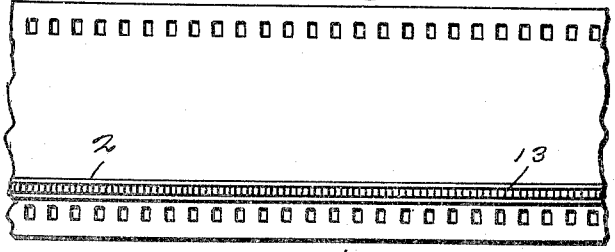
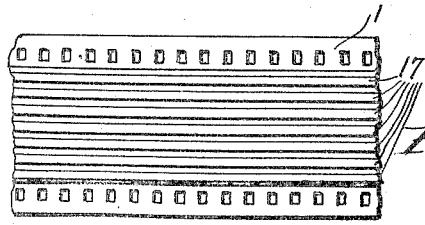
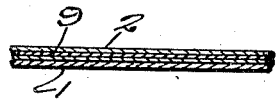
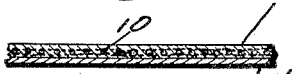
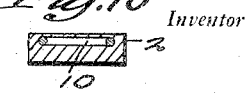

Patented Feb. 13, 1951

2,541,136

UNITED STATES PATENT OFFICE 2,541,136

MOTION-PICTURE FILM WITH MAGNETIC SOUND TRACK

Stanley W. Warren, Corpus Christi, Tex.

Application December 1, 1944, Serial No. 566,142

6 Claims. (Cl. 274—41.4)

This invention relates to motion picture films provided with sound tracks and it has particular reference to films having a sound track capable of being magnetized during or after the exposure, so as to record and reproduce speech and other sounds according to Poulsen's principle.

Magnetic sound tracks have very great advantages. One of the main advantages consists in the simplification of the sound recording and sound reproducting equipment which renders it possible, for instance, to produce simple, inexpensive and easily manipulated amateur cameras and home projectors for talking motion picture films, a goal which has not been attained to any considerable extent with films having photographic sound tracks. This simplification manifests itself also in other respects, as it permits reduction in bulk and weight of ambulant out-door and other film production cameras. The magnetic equipment, moreover, is less affected by rough handling than the photographic sound film equipment with its photo-cell arrangement, its high tension batteries and its highly sensitive amplifier arrangement.

On account of these and many other advantages, endeavors to produce a motion picture film with a magnetizable sound track have repeatedly been made. These endeavors were not successful, thus far, on account of several great difficulties associated with the manufacturing of the film of this type. A small number of metals only have magnetic properties in the required degree, and, therefore, metal parts such as wires, tapes, ribbons, or relatively thick metal layers on deposits have to be united with the cellulosic material. This more or less mechanical union of two very heterogeneous materials could not be brought to such perfection that a usable motion picture film, having all the requisite properties for being handled in the usual type of cameras and projectors and in the various preparation stages was obtained.

One of the main difficulties experienced in connection with combined films of cellulosic and metallic material consists in the lack of uniform pliability, and of uniform expansion and contraction of the components. During reeling and unreeling and during the passage of the film around rollers and through loops, the components detach themselves from each other or become loose, thus destroying the synchronism. The cementitious materials holding the metal ribbon on the film base, moreover, are unable to stand the strain of an unequal shrinkage or expansion, which occurs to a certain extent during the chemical treatment of the emulsion after exposure.

Another difficulty is due to the unequal thickness of the combined film and to its increased thickness, at least in some parts of its cross section. This increase in thickness greatly impairs handling by the usual equipment and causes speedy deterioration and destruction of the film.

The primary object of the present invention is, therefore, the production of a motion picture film with a magnetic sound track which, in spite of the difficulties above mentioned, shows a uniform and satisfactory measure of pliability, a coefficient of expansion and contraction which is approximately uniform in all parts of the film, and a thickness which is uniform across its entire width, and which is not appreciably increased at the point or points on which the magnetic material is applied.

It is a further object of the invention to produce a film with a magnetic sound track which will lend itself to the various processes of cutting, splicing and editing without detrimental effects.

It is a further object of the invention to attach the magnetic material to, or to incorporate it into the cellulose film during the production of the film base so as to secure a perfectly unitary structure of the film.

Many further objects and advantages are described in the following specification.

With these and other objects in mind, the invention consists in a motion picture film provided with a magnetic sound track, as described in the following specification, shown in the drawings and characterized in the appended claims. It is to be understood, however, that the invention is not limited to the specific examples illustrated or described in specific terms in connection with these examples. The result may be obtained in a variety of ways which, although not specifically described, are foreshadowed in the present application and will be clear to the expert skilled in the art when following the principles described, and further changes may be introduced without in any way departing from the essence of the invention.

In the accompanying drawings a number of modifications of the film provided with a magnetic sound track are shown.

Figure 1 is a view of the upper or emulsion side of the film into which a magnetic sound track has been incorporated.

Figure 2 is a sectional view showing a longitudinal section through the film and through the strip-like base carrying the magnetic sound track.

Figure 2a is a sectional view showing a cross-section thrugh the base strip carrying the magnetic sound track.

Figures 3, 4, 4a are views and sectional views similar to those shown in Figures 1, 2 and 2a respectively of another modification of the invention.

Figures 5, 6 and 6a are views and sectional views similar to those shown in Figures 1, 2 and 2a respectively of another modification of the invention.

Figures 7, 8 and 8a are views and sectional views similar to those shown in Figures 1, 2 and 2a respectively of another modification of the invention.

Figures 9, 10 and 10a are views and sectional views similar to those shown in Figures 1, 2 and 2a respectively of another modification of the invention.

Figures 11, 12 and 12a are views and sectional views similar to those shown in Figures 1, 2 and 2a respectively of another modification of the invention.

Figures 13, 14 and 14a are views and sectional views similar to those shown in Figures 1, 2 and 2a respectively of another modification of the invention.

Figures 15, 16 and 16a are views and sectional views similar to those shown in Figures 1, 2 and 2a respectively of another modification of the invention.

Figure 17 is a view of the upper side of a film provided with two sound tracks.

Figure 18 is a view of the upper side of a film provided with a plurality of sound tracks covering its entire surface.

In order to understand the principle governing the production of the film, it may first be mentioned that the magnetic material is either ferro-magnetic material or an alloyed steel, the latter being composed of soft iron, tungsten, chromium, cobalt and other materials. The alloy is so chosen that the magnetic material, if used in the form of wire or ribbon, will have a pliability and a coefficient of expansion and contraction which is adapted to the application of the same film. As an example, the alloys which are known under the trade names tungsten magnet steel, chromium magnet steel, and Japanese steel may be mentioned as alloys answering the requirement.

The magnetic material is first applied to a base sheet, which is a large, thin sheet of either cellulose nitrate or cellulose acetate, this material being chosen in accordance with the material of the film. The magnetic material is placed, spread or laid on said base sheet and over the base sheet and magnetic material a coating of "dope" is spread. "Dope" is the name applied to the viscous nitro cotton solution, or viscous cellulose acetate solution, resembling honey in appearance, which is used for making the film. The solvent used is either acetone, methyl alcohol, acetic acid, or another solvent such as used in film production, camphor or other softening substances being added. The solvents evaporate and the cellulose nitrate or acetate unite with the base sheet of cellulose nitrate or acetate, thus locking in the magnetic material which becomes an integral part of the base sheet.

The under side of the base sheet is now preferably treated with an etching solution called "substratum," which slightly roughens its under surface and increases its faculty to firmly adhere to a film.

When the base sheet has been prepared in this way, it is cut into narrow strips and these are now ready to be applied to the films, which are afterwards coated with the photographic emulsion.

The application of these thin strips of base sheet with magnetic material locked into the motion picture film may be performed during the manufacturing of the film or at any time during the subsequent preparation of the same. Of the various modifications described later, some lend themselves to the first type of application, while others are better adapted for an application to an already formed film. When finely divided magnetic material is used, it may, of course, be sprayed or flowed and enclosed in a manner to be described more fully in connection with the specific modification employing such granular and finely divided material.

The application of the strips consisting of a base sheet with enclosed and locked magnetic material during the manufacturing of the film is performed in the following way:

The film, as well known, is prepared from cotton linters which are first cleansed and dried and are then nitrated. The nitro cotton is then immersed in water and is washed, the latter step being continued until the material is acid free. It is then dehydrated by means of alcohol and dissolved in suitable solvents (acetone, methyl-alcohol) with softeners like camphor added. The "dope" thus obtained, consisting of the viscous nitro-cotton solution and which is a liquid of the consistency of honey, is now spread as a thin film by making a thin coat on a traveling surface, which, as a rule, is the surface of a large drum, about fifteen feet in diameter and four feet across, rotating slowly around its axis so that by the time one rotation is completed, the solvents have evaporated sufficiently to set the film, which is then stripped off and dried further.

It is during this stage of the manufacturing of the film that the base sheet strips with the locked-in magnetic material are applied.

As already stated, the base sheets carrying the magnetic material have been cut into thin strips. These strips are set on rolls which are evenly spaced for the required distance (depending on the width of the film of 8 mm., 16 mm., 35 mm.), and these strips are fed to the traveling surface as it picks up a coating of "dope."

It will be clear that on account of the width of the film web during this process, a certain number of strips have to be fed simultaneously in spaced relation to the traveling surface in order to provide the film web with the required number of sound tracks, so that each film ultimately cut out of the film web shall be provided with a strip carrying the magnetic sound track.

In some cases metallic belts are used instead of large drums for taking up the viscose dope, but this does not affect the way of applying the base sheet strips.

The process has been described in connection with nitro cellulose films, but the preparation of acetate films used for 8 mm. and 16 mm. films is identical as far as the connection with the present invention goes.

It may be mentioned that the film base, when taken from the drums and after having been dried, has a high polish and may be used or stored or seasoned until required. Before being coated with the emulsion, one side is heated with an etching solution (substratum) that slightly roughens the surface to hold the emulsion firmly, The back in the case of motion picture films is coated with a non-curling coat of hardened gelatine, which equalizes the strain of the emulsion, and this coating is so selected when a magnetic sound track is prepared that the combined strain of the emulsion and of the magnetic sound track is counteracted.

The second method of application above mentioned consists in providing an already prepared film with the base sheet carrying the magnetic sound track. In this case a shallow recess, trough or groove is cut into the film along the edge of the motion picture film where the sound track has to be applied. The etched side of the base sheet strip carrying the magnetic sound track material is then coated with a cement composed of solvents, such as acetone, acetic acid, methyl, alcohol, camphor, and the like, which dissolves the material of the film base. This coating softens both the film base and the base sheet strip and the latter is then firmly pressed into the recess in the groove and held there until the solvent has evaporated.

The base sheet strip thus forms an integral part of the motion picture film which will have no tendency to break away from the film during the reeling or rewinding operation or during its run through the projector.

In the drawings, various methods of providing the base sheet with magnetic material are illustrated.

Figure 1 shows a base film 1 provided with a base sheet strip 2 in which parallel fine wires 3 are embedded and locked in the manner above described.

The base sheet is prepared by spreading parallel fine wires evenly over the sheet and applying the coating of "dope" as above described. It is then cut into thin strips 2 shown in longitudinal section in Figure 2 and in cross section in Figure 2a. The strip 2 may be applied either during the manufacturing process or thereafter.

For the modification illustrated in Figures 3, 4 and 4a, finely divided granular (micron) ferro magnetic material 5 is used.

The preparation of the base sheet containing the magnetic material may be slightly different from that described. The granular and finely divided magnetic material is mixed with the "dope" and the latter is spread over the base sheet and forms the desired coating. The base sheet may now be cut into strips and applied to the film base during or after manufacturing, as described.

With this modification, however, another method of application of the granular magnetic material is possible. A shallow well, groove or recess is first cut into the film base 1 which is exactly of the width of the sound track 5. "Dope" with the distributed magnetic material is then filled directly into the groove, so that no base sheet need be prepared first. The "dope" unites with the film base 1 as it softens it first and afterwards, when the solvents evaporate, becomes integral with the film base, the granular material being locked firmly within the strip treated.

Figures 5, 6, 6a and 7, 8 and 8a show a modification using one and two-wire strands 7 and 7a, respectively, arranged in parallel to the film, as magnetizable sound record bearers. The embedding of the wire into the base sheet and application of strips 2 cut from the latter are processes identical with those already described.

Figures 9, 10 and 10a illustrate the use of a flat thin ribbon embedded into a base sheet strip 2.

Figures 11, 12 and 12a, 13, 14 and 14a and 15, 16 and 16a illustrate the use of double-back single and double wire strands embedded into the base sheet and applied to the film base according to the methods described. Single or double strand wires may be doubled back as shown in Figure 11 at 10 so as to form a straight line from which bristles or short sections 11 project.

Alternatively the single or double strand wire may be bent in wave or maeander form as shown at 12 in Figure 13.

Another modification shown in Figure 15 shows a multiple wire arrangement 13 in which two wire strands which are doubled back, for instance, strands like those shown in Figures 11 and 13, have been combined to form two strands joined by cross sections.

All wire strands which have been doubled back may expand or contract in longitudinal direction in a manner which follows the expansion or contraction of the base on account of their me-mechanical structure and this expansion or contraction is not dependent upon the coefficient of expansion of the material of which they consist.

In Figure 17 a film 1 with a double sound track 14, 15 is shown, each consisting either of a single wire, double wires, a ribbon, or wire strands, such as shown in any of the preceding figures. The reason for using two sound tracks 14, 14 placed symmetrically on the film on both sides of the area reserved for the pictures is the greater mechanical strength and resistency which may be imparted to the film in this way. Film bases as well known, have a certain tendency to warp or to buckle due to the loss or to the absorption of moisture in the course of the chemical processes to which they are subjected. This causes the film to jump in and out of focus during the passage of the picture aperture or of the film pressure plate. Moreover, when this happens at the scanning point for the sound track, sound reproduction is affected. The double magnetic sound track forms a reinforcing structure preventing excess of buckling and warping and holding the film in the correct plane.

A further modification of the invention is shown in Figure 18 illustrating a modification in which the entire film area has been used to accommodate a number of parallel magnetic sound tracks 17, arranged side by side. They may be incorporated into the film base in the manner above described during the manufacturing process. The use of multiple sound tracks has been repeatedly proposed and was in some cases highly successful for high fidelity reproductions feeding separate and individually adjusted loud-speakers or banks of loud-speakers. Moreover, a plurality of sound tracks may be used to reduce to a minimum background noises, mechanical noises, or exciter lamp hiss which as a rule cannot be completely eliminated in other types of film recording.

The above description will have made it clear that motion picture films, according to the invention, will fulfill the requirements above set forth of even thickness throughout the entire cross section not larger than about .0055 of an inch, which is the usual thickness of motion picture films. The embedding and locking of the magnetic material properly selected as regards coefficient of expansion and pliability, will counteract most effectively any tendency towards loosening and separation. Indeed, such a tendency would have to overcome not only the resistance offered by the surrounding base sheet material which in fact acts as a unit, but also the resistance against separation of the base sheet from the film base which is equally strong.

Moreover, the transverse wires or the double back wires, on account of the faculty to move the individual transversal sections, are able to accommodate themselves fully to any shrinkage or elongation the base strip may undergo, the latter, of course, being in complete accord with the film base itself. It is thus seen that all the changes and variations of the film, whether due to chemical or mechanical treatment, do no longer, in a motion picture film with a magnetic sound track according to the invention, provoke the strains or stresses which tend to destroy or loosen the unitary structure of the bonded and united components, as was manifestly the case in earlier endeavors to produce a motion picture film with a magnetic sound track.

What I claim is:

1. A motion picture film with a magnetic sound track, comprising a picture carrying film provided with perforations and further provided with a longitudinal recess running along the picture carrying area of the film between the latter and the perforations, a separate base strip consisting of a material substantially identical with that of the film and of a length equal to that of the film, said base strip carrying ferromagnetic magnetizable material embedded within it near one of its surfaces, said base strip filling the longitudinal recess and being held therein with the surface near which the magnetic material is embedded slightly protruding over the film surface, said base strip being fixed in said recess by an adhesive.

2. A motion picture film as claimed in claim 1 in which the surface of the base strip, near which the magnetic material is embedded, is covered by a coating consisting of a dried viscous solution of the film material in a solvent.

3. A motion picture film with a magnetic sound track as claimed in claim 1 wherein the base strip is covered by a layer covering one of its surfaces and consisting of a dried viscous solution of cellulosic film material in a solvent in which granular ferro-magnetic magnetizable material is dispersed.

4. A sound film as claimed in claim 1 in which the normally picture carrying area of the film is covered with a series of regularly spaced parallel recesses within which base strips with embedded magnetic material are held and are embedded.

5. A motion picture film with a magnetic sound track as specified in claim 1 wherein the magnetic material consists of wire sections embedded in the base sheet strip.

6. A motion picture film with a magnetic sound track as specified in claim 1, wherein the magnetic material consists of a large number of parallel wire sections running transversely to the film strip and embedded into the base strip.

STANLEY W. WARREN.

REFERENCES CITED

The following references are of record in the file of this patent:

UNITED STATES PATENTS

| Number | Name | Date |
|---|---|---|
| 1,466,750 | Peterson | Sept. 4, 1923 |
| 1,656,216 | Melby | Jan. 17, 1928 |
| 1,832,097 | Chipman | Nov. 17, 1931 |
| 1,847,860 | Best | Mar. 1, 1932 |
| 1,883,562 | Chipman et al. | Oct. 18, 1932 |
| 1,949,409 | Cohen | Mar. 6, 1934 |
| 2,243,736 | Loblein | May 27, 1941 |